April 25, 1933.  S. F. BERNSTRÖM  1,905,261

SPEED INDICATOR

Filed June 5, 1931

INVENTOR

Seth Fredrik Bernström

BY

Busser and Harding

ATTORNEYS.

WITNESS:

Rob P Kitchel.

Patented Apr. 25, 1933

1,905,261

UNITED STATES PATENT OFFICE

SETH FREDRIK BERNSTRÖM, OF STOCKHOLM, SWEDEN, ASSIGNOR TO THE DE LAVAL SEPARATOR COMPANY, OF NEW YORK, N. Y., A CORPORATION OF NEW JERSEY

SPEED INDICATOR

Application filed June 5, 1931, Serial No. 542,302, and in Sweden June 20, 1930.

In the operation of centrifugal machines, and particularly of hand-operated separators, it is known to provide an audible signal which operates when the bowl is rotating at too low a speed. A known type of such speed indicator comprises a rolling or sliding body placed in a closed channel that is positioned around the rotation center of the shaft and that is of such construction that the rolling or sliding body hits a bell at each turn of the shaft, the bell embracing the channel, which has the shape of a section of a curve. The formation of these channels, whose walls should be as smooth as possible in order to insure the certain and accurate operation of the speed indicator, presents technical difficulties, which it is the object of the present invention to overcome. The present invention comprises two straight channels or borings, arranged at an angle one to the other and diverging one from the other, one of said straight channels being so formed and positioned that the ball or other moving or sliding body will, under the influence of gravity and centrifugal force combined, strike a bell at each turn of the shaft, and, under the influence of gravity alone, recede from the bell at each turn of the shaft, such operation continuing while the shaft is speeding up until the shaft reaches such speed that sufficient time is not afforded for the ball to travel its entire course back and forth in one revolution of the shaft. The ball then does not reach the bell, which ceases ringing. In the preferred construction, one of the borings, namely, that longer boring in which the ball travels toward the bell, extends through the rotation center of the shaft, while the other and shorter boring extends along a chord of an arc of rotation.

Figure 2:
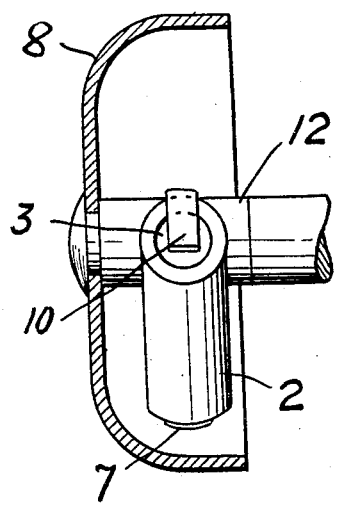
Figure 1:
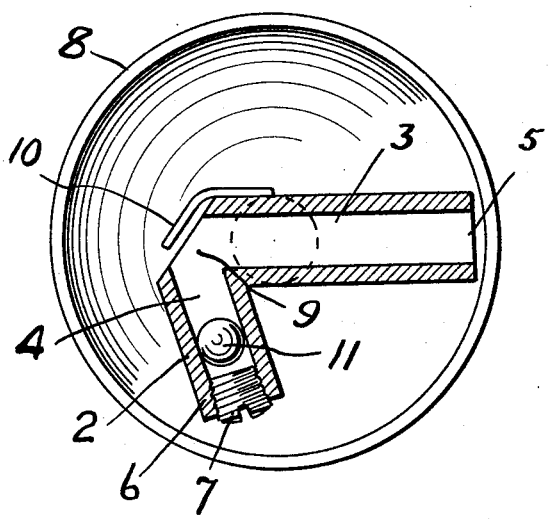

In the drawing, which shows a preferred embodiment of the invention: Fig. 1 is a view of the speed indicator taken as a section at right angles to the shaft whose speed is to be indicated; Fig. 2 is a side view of the speed indicator with the bell shown in section.

The shaft 12 is a continuation of the shaft the speed of which is to be indicated. On this shaft is an angular element 2 in which is formed a straight boring 3 whose center line extends through, and at right angles to, the axis of the shaft. Another straight boring 4 in the same element is disposed angularly to, and communicates with, the first mentioned boring. The boring 3 is open at the free end 5 thereof more distant from the center of the shaft; whereas the free end 6 of the other boring 4 is closed by a suitable device, for instance, a screw plug 7. The two borings thus form a channel in the shape of an angle which is closed at one end and open at the other end.

A bell 8, positioned around the element 2, is rigidly connected with the shaft 12 of the speed indicator and thus also with the element 2.

In order to facilitate the manufacture, the knee 9 formed between the two borings is open. By placing some suitable member, for instance, an elastic plate 10, over the opening, the traveling weight 11 enclosed in the channel is prevented from falling out. The weight 11 may suitably be a ball.

Assume that the shaft 12 is in the position shown in Fig. 1. The ball is then at the closed end of boring 4. Assume that the shaft is now rotated clockwise, which is the proper direction. When the shaft reaches the point in its rotation at which the ball rolls away from the closed end of boring 4 to the knee 9, the boring 3 has moved somewhat beyond its vertical position, but it is inclined only slightly to the vertical and the ball falls down through it and strikes the bell. The boring 3 soon thereafter swings up into a horizontal position and while it is swinging toward a vertical position the ball travels back against the plate 10 and, after the shaft turns still further, rolls along channel 4 against the plug 7. The ball is then back at its starting position. During repeated revolutions of the shaft there is thus obtained one sound impulse at each rotation of the shaft.

The speed, however, is gradually increasing. A certain time is required for the ball to roll through channels 4 and 3 and strike the bell. As the rotation speed increases, the channel 3 will, when the predetermined speed has been reached, turn so far during said required time that the outer end will be higher than the center and will reverse the movement of the ball before it strikes the bell, which will cease to ring until the speed is again reduced.

The plate 10 is made elastic in order to soften the sound arising from the bell striking the plate. By bending the plate 10 in or out the indicator can be adjusted to operate at correct speed.

The described construction facilitates the manufacture of the speed indicator; the formation of a straight channel, especially one extending through the center of the speed indicator, being much more readily effected than the formation of a curved channel; the construction being, therefore, more simple, practical and reliable.

The invention is particularly adapted for application to the driving or crank shaft of a centrifugal separator. Such shaft is so geared to the shaft which directly drives the separator bowl that the latter shaft has many times the speed of the former. Consequently the shaft 12 rotates always at a relatively low speed, so that gravity is the controlling factor in the operation of the ball, centrifugal force being of no substantial importance.

Having now fully described my invention, what I claim and desire to protect by Letters Patent is:

1. In a speed indicator, the combination, with a shaft and a bell, of means providing a channel rigidly connected to and turning with the shaft, and a member adapted to travel back and forth in said channel, said channel comprising two straight borings in divergent relation, the free end of one of said borings being in such relation to the bell that the traveling member is adapted, when it reaches said free end, to strike the bell at each rotation of the speed indicator whenever the rotation speed of the shaft is less than a predetermined speed.

2. A speed indicator in accordance with claim 1 in which the boring in operative relation with the bell extends through the axis of the shaft.

3. A speed indicator in accordance with claim 1 in which the channel is provided with an opening at the angle between the two borings, in combination with an elastic plate extending over said opening to the extent necessary to prevent the escape from the channel of the traveling member.

4. In a speed indicator, the combination, with a shaft and a bell, of means providing a channel turning coincident with the shaft, and a member adapted to travel back and forth in said channel, said channel comprising two borings in divergent relation, one boring being a straight boring extending from the bell toward and beyond the axis of the shaft to the other boring, which extends at an acute angle to the first boring and has a closed end.

5. In a speed indicator, the combination, with a shaft and a bell, of means providing a channel turning coincident with the shaft, and a member adapted to travel back and forth in said channel, said channel comprising two borings in divergent relation, one boring being a straight boring extending from the bell toward and beyond the axis of the shaft to the other boring, the second boring being comparatively short and having a closed end.

6. In a speed indicator, the combination of a bell, a striking device, and means to drive said striking device from the apparatus the speed of which is to be indicated, said striking device comprising a member continuously rotatable in one direction and having two straight bores joining at an angle and a member rollable therein.

7. In a speed indicator, the combination, with a shaft and a bell, of means providing a channel turning coincident with the shaft, said channel having one end adjacent the bell, and a member adapted to travel back and forth in said channel, said channel comprising two straight bores intersecting at an angle.

8. A speed indicator in accordance with claim 1, in combination with a member, located at the junction of the two borings, which is adjustable to correctly time the indicator.

In testimony of which invention, I have hereunto set my hand, at Stockholm, Sweden, on this 13th day of May, 1931.

SETH FREDRIK BERNSTRÖM.